Dec. 30, 1924.  1,520,996
A. J. BASTIAN
CONTAINER AND METHOD OF MOLDING THE SAME
Filed Aug. 3, 1921
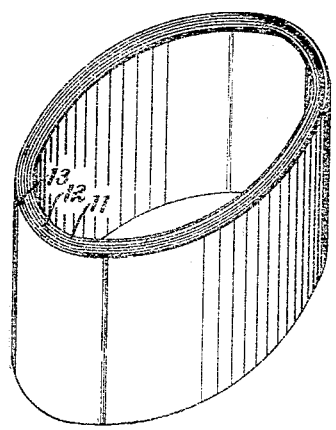
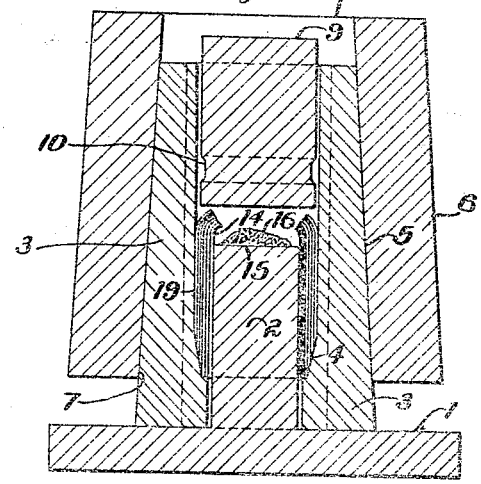
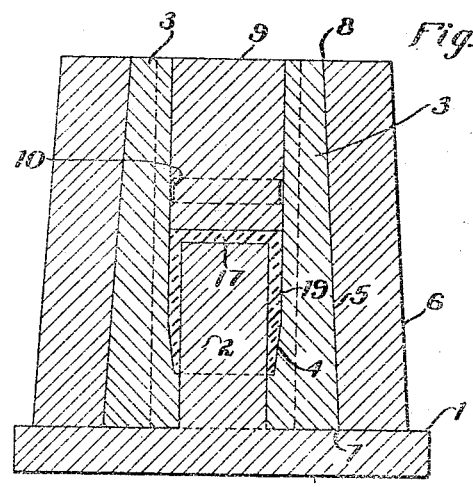
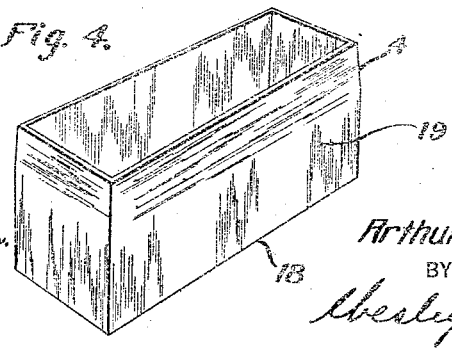
WITNESSES:
L. F. Sonnemann
W. B. Jaspert
INVENTOR
Arthur J. Bastian.
BY
Chesley L. Carr
ATTORNEY

UNITED STATES PATENT OFFICE.

ARTHUR J. BASTIAN, OF WILKINSBURG, PENNSYLVANIA, ASSIGNOR TO WESTINGHOUSE ELECTRIC & MANUFACTURING COMPANY, A CORPORATION OF PENNSYLVANIA.

CONTAINER AND METHOD OF MOLDING THE SAME.

Application filed August 3, 1921. Serial No. 489,458.

*To all whom it may concern:*

Be it known that I, ARTHUR J. BASTIAN, a citizen of the United States, and a resident of Wilkinsburg, in the county of Allegheny and State of Pennsylvania, have invented a new and useful Improvement in Containers and Methods of Molding the Same, of which the following is a specification.

My invention relates to molded articles, more especially to molded containers of fibrous sheet material and a resinous binder.

Heretofore, containers of round and angular shapes have been formed by molding compositions of shredded fibrous material, such as wood flour, asbestos, fabric and the like, impregnated with a binder such as shellac, albumin, casein, blood glue, phenolic condensation products and the like, by placing such treated materials in a suitably shaped mold and compacting them under heat and pressure.

Containers so formed, although of appreciable strength and durability, are relatively weak because of brittleness and the short lengths of the fibers employed therein. Consequently, such structures must be of relatively large size to ensure the requisite strength of containers.

My invention obviates these disadvantages, it being among the objects thereof to form molded articles of this type that shall be mechanically strong relative to their cross sections, have a homogeneous structure throughout the wall portions, be relatively simple to construct and which may be formed in large sizes.

I propose forming containers having the wall portions thereof of composite laminated fibrous sheet materials and their bases of laminated materials or of molding compositions such as mentioned above.

In practising my invention, I form a plurality of superposed convolutions of fibrous sheet material such as woven fabric, felt, paper or the like impregnated with a resinous binder, preferably a phenolic condensation product, which may be disposed on a round or angular shaped matrix in a mold. The upper edge of the wound strip is allowed to project slightly above the top of the matrix which may contain a molding mixture such as shredded fibrous material, wood flour and the like, and a condensation product. I further provide a plurality of side pressure plates which I dispose around the material a retaining matrix to hold the assembled parts together and a pressure platen to close the mold which is inserted in a hydraulic press and subjected to heat and pressure to consolidate the molding materials to form a unitary structure.

In the accompanying drawings, in which like reference characters designate like parts Figure 1 is a perspective view of a spirally wound strip of sheet material impregnated with a resinous binder;

Fig. 2 is a cross sectional view of a mold showing the assembled material prior to molding;

Fig. 3 is a cross sectional view of the mold closed during the molding operation, and Fig. 4 is a perspective view of a molded article formed in accordance with this invention.

I provide a mold, comprising a base plate 1 having a matrix 2 projecting therefrom. A plurality of wedge shaped side pressure plates 3 positioned about said matrix have tapered off-set portions 4 formed on the inner sides thereof and have their outer sides 5 tapered for engagement with a correspondingly tapered pressure member 6, the opening 7 in the lower end thereof being larger than the opening 8 in the upper end thereof. A pressure member or platen 9, having a groove 10 formed therein to prevent binding, is provided to close the top of the mold.

I provide a plurality of spirally wound convolutions 11, 12 and 13 and the like of fibrous sheet material impregnated with a suitable binder, such as a phenolic condensation product, which are pressed or formed over the matrix 2, the ends 14 of the convolutions projecting over the top surface 15 of the matrix 2, on which is placed a molding composition 16 of wood flour, shredded fibrous materials or the like and a binder.

The members 3, 6 and 9 are then assembled in their respective positions and the mold is inserted between the heated platens of a hydraulic press. Heat and pressure are applied, the pressure closing the mold, as shown in Fig. 3, causing the projecting ends 14 of the convolutions to be crimped over the surface 15 of the matrix 2 and to consolidate with the molding composition 16 provide the base 17 of the container 18. The wall portions, consisting of superposed laminations, partly reinforce the base by intermingling with the shredded fibers of the molding composition.

The molding composition 16 may be omitted and the spirally wound strip may project sufficiently above the top of the matrix 2 to provide, after molding, a bottom integral with the walls 19 or treated sheet material may be substituted for the molding composition 16.

The beveled edge 4' of the container may be eliminated or the edge may be rounded or grooved to suit requirements and various other changes may be made in the shape or design of articles so formed by making corresponding changes in the mold elements 2, and 9.

Articles thus formed may be employed as insulating members for the ends of bus bars and the like and for general insulating purposes requiring hollow containers. Non-metallic articles of this nature may also be employed for artistic and decorative purposes.

It will be readily seen from the above description of my invention that articles formed in accordance therewith are a distinct improvement over the prior art in that layers of sheet material which are relatively long are employed therein.

I claim as my invention:—

1. A molded article comprising a rectangular body portion of a plurality of spirally wound layers of fibrous sheet material and a bottom of said layers of sheet material, consolidated with a phenolic condensation product.

2. A molded article comprising a rectangular body portion and a bottom portion of a plurality of spirally wound layers of fibrous sheet material and a bottom portion of molded composition, consolidated with a phenolic condensation product.

3. A molded article comprising a plurality of spirally wound layers of fibrous sheet material forming a rectangular body portion and a bottom of fibrous sheet material, consolidated with a phenolic condensation product.

4. A molded article comprising a plurality of spirally wound layers of fibrous sheet material and a bottom of molded composition, consolidated with a phenolic condensation product.

5. A molded article comprising a plurality of spirally wound layers of fibrous sheet material impregnated with a phenolic condensation product, and a bottom formed of fibrous sheet material impregnated with a phenolic condensation product, consolidated and hardened under heat and pressure.

6. A molded article comprising a plurality of spirally wound layers of fibrous sheet material and a molded bottom of shredded fibrous material, consolidated with a phenolic condensation product.

7. A molded article comprising a plurality of spirally wound layers of fibrous sheet material forming a rectangular body portion and a bottom of fibrous sheet material formed integral therewith and consolidated with a phenolic condensation product.

8. A method of forming an article which comprises providing a mold, disposing a spirally wound strip of fibrous sheet material impregnated with a binder about a matrix within said mold, an edge of said material projecting above said matrix, closing said mold and applying heat and pressure thereto to form a unitary structure.

9. A method of forming an article which comprises providing a mold, disposing a spirally wound strip of fibrous sheet material impregnated with a binder about a matrix within said mold, an edge of said material projecting above said matrix, placing a molding mixture in said projecting portion, closing said mold and applying heat and pressure thereto to form a unitary structure.

10. A method of forming an article which comprises providing a mold, disposing a spirally wound strip of fibrous sheet material impregnated with a binder about an angular matrix within said mold, an edge of said strip projecting above said matrix, placing a shredded fibrous molding mixture in said projecting portion, closing said mold and applying heat and pressure thereto to form a unitary structure.

11. A method of forming an article which comprises providing a mold, disposing a spirally wound strip of paper impregnated with a phenolic condensation product about the matrix of said mold, an edge of said strip projecting above the top thereof, closing said mold and applying heat and pressure thereto to form a unitary structure.

12. A method of forming an article which comprises providing a mold, disposing a spirally wound strip of fabric impregnated with a phenolic condensation product about the matrix of said mold, an edge of said strip projecting above the top thereof, closing said mold and applying heat and pressure thereto to form a unitary structure.

In testimony whereof, I have hereunto subscribed my name this 27th day of July 1921.

ARTHUR J. BASTIAN.